J. BART.
NON-REFILLABLE BOTTLE.
APPLICATION FILED APR. 4, 1917.
1,251,736. Patented Jan. 1, 1918.
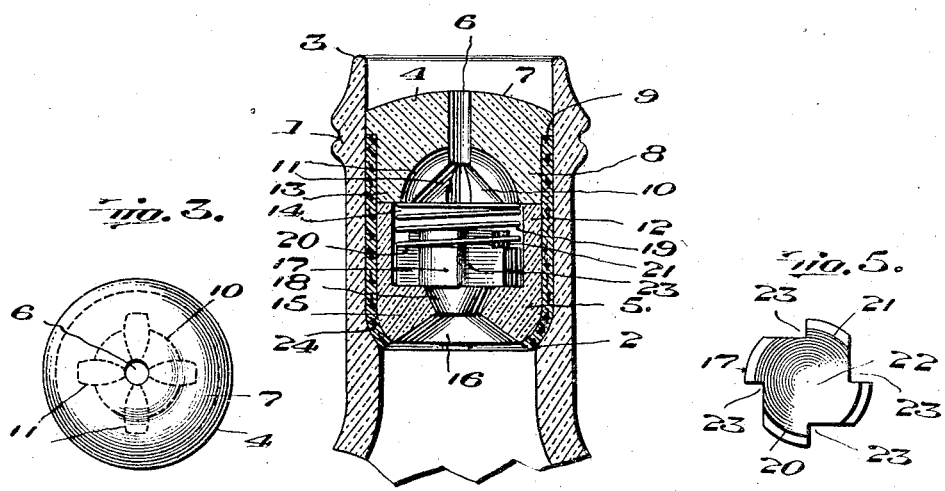
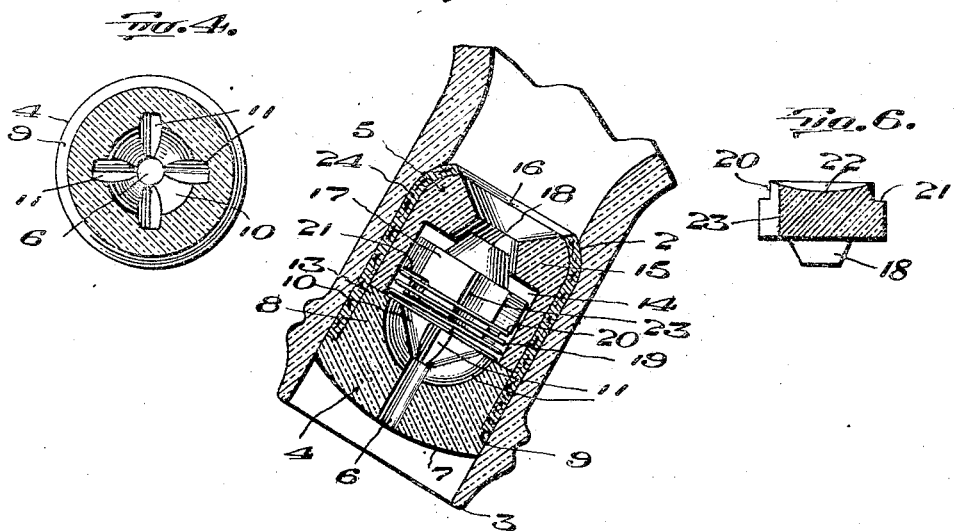
Witness
Philip E. Barnes
Inventor
Joseph Bart
By Edson Bros.
Attorneys

UNITED STATES PATENT OFFICE.

JOSEPH BART, OF ARLINGTON, NEW JERSEY, ASSIGNOR OF ONE-HALF TO PETER HABENSCHADEN, OF NEW YORK, N. Y.

NON-REFILLABLE BOTTLE.

1,251,736.     Specification of Letters Patent.     Patented Jan. 1, 1918.

Application filed April 4, 1917. Serial No. 159,641.

*To all whom it may concern:*

Be it known that I, JOSEPH BART, a citizen of the United States, residing at Arlington, in the county of Hudson and State of New Jersey, have invented certain new and useful Improvements in Non-Refillable Bottles; and I do hereby declare the following to be a full, clear, and exact description of the invention, such as will enable others skilled in the art to which it appertains to make and use the same.

This invention is a device for controlling a discharge of a liquid from a container, and is designed more particularly for use in connection with bottles or similar containers.

It has for its object to provide means whereby the liquid contents of a bottle or other similar container may be intermittently discharged therefrom, and whereby a bottle or other container equipped with the device shall be made non-refillable.

With this object in view, the invention comprises a valved stopper which may be inserted into the neck of a suitable container whereby the liquid contents of the container may be intermittently discharged therefrom, but whereby any attempts to refill the container with the same or with any other liquid will be effectually frustrated by the closure of a valve contained within the stopper.

One embodiment of my invention is hereinafter fully described, illustrating in the accompanying drawings, and more particularly pointed out in the appended claims, it being understood that such changes in size and proportion of parts and in minor details of construction may be made as fairly fall within the scope of the appended claims without departing from, or sacrificing any of the advantages of the invention.

In the drawings:—

Figure 1 is a sectional view showing the stopper inserted in the neck of a bottle.

Fig. 2 is a similar view showing the position of the valve in its open or discharging position.

Fig. 3 is a detail view of the stopper head or nozzle.

Fig. 4 is a sectional view of the same.

Fig. 5 is a detail view of the valve.

Fig. 6 is a sectional view of the valve.

Like reference numerals are used to designate like parts throughout.

In the embodiment of the invention, disclosed in the accompanying drawings, 1 designates the neck of a bottle or any other suitable liquid container, and is shown provided with an internal shoulder 2 at a suitable distance from its upper extremity 3. The stopper designed to be inserted into the bottle neck may be made of any suitable material, such as glass, porcelain, or metal, but it is preferably made of unannealed glass for purposes hereinafter to be explained.

The stopper is shown comprising an upper member or nozzle 4, and a lower member 5. The nozzle 4 is preferably cylindrical in form and may be provided with a centrally positioned aperture 6, said aperture being shown also cylindrical in form. The upper extremity of the nozzle 4 may be convex as shown at 7, and of a diameter substantially equal to the internal diameter of the bottle neck, while the lower portion 8 of said nozzle is of a slightly reduced diameter, said reduced portion terminating in a shoulder 9. The underside of the nozzle 4 is preferably hollowed out to form an arcuate recess 10 which is shown provided with a plurality of ducts 11 radially communicating with the central aperture 6.

The lower member 5 is shown positioned beneath the nozzle 4 and may be of a diameter substantially equal to that of the reduced portion 8. The upper extremity 12 of the lower member 5 is shown in engagement with the lower extremity 13 of the nozzle 4, thereby forming a cylindrical chamber 14. The bottom 15 of the lower member 5 may be provided with a frusto-conical port 16 communicating with the interior of the bottle.

Positioned within the chamber 14 is shown a valve member 17, the external diameter of which may be substantially equal to the internal diameter of the chamber. The valve is shown provided on its lower face with a centrally positioned frusto-conical projection 18 to snugly engage the corresponding port 16, thereby effectively preventing the passage of liquid into or out of the bottle. The valve 17 may be held in a normally closed position by means of the resilient member 19, shown mounted upon a shoulder 20 of the valve and engaging the lower extremity 13 of the nozzle. The shoulder 20 may be formed by slightly reducing the diameter of the valve adjacent its upper extremity, as shown at 21. The upper face of the valve 17 may be concave as shown at 22. To permit of the liquid, admitted through the port 16 when the valve is open, passing through the nozzle 4, the valve may be provided on its periphery with a plurality of angular notches 23.

To maintain the various parts of the device in operative position, a sleeve of cork or other suitable material 24 may be provided to encompass the lower member 5 and the nozzle 4, said sleeve being shown abutting against the shoulder 9 of the nozzle and extending substantially throughout the length of the stopper.

To apply a stopper to a bottle, the assembled device is inserted into the neck thereof and pushed until the lower extremity abuts against the internal shoulder 3 of the bottle neck. The stopper may be of such length as to lie wholly within the neck of the bottle terminating preferably a suitable distance below the upper extremity thereof, as shown in Fig. 1. The removal of the stopper from the bottle is thus effectually prevented since as has been mentioned hereinbefore, the stopper in the preferred form is made of unannealed glass which will not withstand the force necessary to overcome the adhesion between the cork and the glass of the bottle neck, if one should endeavor to extract the stopper therefrom.

To effect the discharge of a liquid from a bottle equipped with the stopper, the bottle is inverted, or the neck thereof inclined downwardly and then oscillated gently up and down. At the termination of each downward stroke, the momentum acquired by the valve and the liquid during the stroke, serves to open the valve against the energy of the spring 19, thereby allowing a small amount of the liquid to pass from the bottle through the port 16 into the chamber 14, thence through the notches 23 around the valve and into recess 10 and out through the aperture 6 of the nozzle by means of the radially communicating ducts 11. On the upward stroke the energy of the spring is again made manifest, thereby closing the port 16. It is to be understood that although the amount of liquid in the bottle at all times assists, through its momentum in opening the valve, the valve may be made of sufficient weight that when the contents of the bottle are but a small percentage of its capacity, the momentum of the valve itself may be sufficient to open the port, thereby allowing the discharge of the entire contents of the bottle.

Having thus described the invention, what is claimed as new is:—

1. A bottle stopper comprising a nozzle provided with a central discharge aperture, a lower member to coöperate therewith, said lower member being provided with a chamber having a conical port communicating with the interior of the bottle, a conical valve to coöperate therewith, an upstanding collar carried by the valve, a spring mounted thereon to engage the nozzle and to thereby retain the valve in a normally closed position, a plurality of longitudinal notches on the periphery of the valve to allow the passage of fluid around said valve, and a plurality of fluid conducting ducts on the receiving end of the nozzle, said ducts radially converging to said central discharge aperture.

2. In combination with a bottle stopper, a valve provided with a plurality of longitudinal notches in its periphery, a concave discharge nozzle provided with a central aperture extending axially therethrough, a plurality of open radial ducts positioned in the concave face of the nozzle and communicating with the central aperture, said ducts operating to facilitate the discharge of fluid escaping around the valve when the same is in close proximity to the nozzle.

3. The combination with a liquid container having a neck provided with an internal shoulder, of a stopper therefor comprising a nozzle having a convex discharge end and a concave receiving end, a cylindrical aperture extending axially through said nozzle, a plurality of radial ducts communicating with said aperture, a valve chamber beneath said nozzle, a conical port therein, a conical valve to engage said port, resilient means to retain the valve normally in the port, means to intermittently admit a liquid through said port from the container into the chamber, and a plurality of angular notches in the periphery of the valve body to permit the passage of the liquid around the valve and out of the nozzle.

In testimony whereof, I affix my signature.

JOSEPH BART.

Copies of this patent may be obtained for five cents each, by addressing the "Commissioner of Patents, Washington, D. C."